United States Patent
Finnie et al.

(10) Patent No.: US 6,627,675 B1
(45) Date of Patent: Sep. 30, 2003

(54) ANTIFOULING COATINGS

(75) Inventors: Alistair Andrew Finnie, Tyne & Wear (GB); Andrianus Antonius Johannes Van Geel, Vught (GB); Ian Stuart Millichamp, Newcastle-UponTyne (GB); Gerardus Cornelis Overbeek, Wallwijk (NL); Terry Yeates, Cheshire (GB)

(73) Assignee: International Coatings Limited, London (GB)

( * ) Notice: Subject to any disclaimer, the term of this patent is extended or adjusted under 35 U.S.C. 154(b) by 0 days.

(21) Appl. No.: 09/620,387

(22) Filed: Jul. 20, 2000

Related U.S. Application Data

(63) Continuation of application No. PCT/GB99/00263, filed on Jan. 26, 1999.

(30) Foreign Application Priority Data

Jan. 27, 1998 (GB) .............................................. 9801747

(51) Int. Cl.⁷ .............................. C08K 3/00; C09D 4/00; C09D 5/14; A01N 25/00
(52) U.S. Cl. ........................ 523/122; 106/15.05; 106/16
(58) Field of Search ........................ 523/122; 106/15.05, 106/16

(56) References Cited

U.S. PATENT DOCUMENTS 5,116,407 A     5/1992   Hunter et al. .................. 106/16

FOREIGN PATENT DOCUMENTS

| EP | 0 069 559 | 1/1983 | ............ C09D/5/16 |
|----|-----------|--------|----------------------|
| EP | 0 232 006 | 8/1987 | ............ C09D/5/14 |
| EP | 0 364 271 | 4/1990 | ............ C09D/5/14 |
| EP | 0 429 215 | 5/1991 | .......... C08F/291/14 |
| EP | 0 529 693 | 3/1993 | ............ C09D/5/14 |
| GB | 1 457 590 | 12/1976 | ............ C09D/5/16 |
| WO | WO 84/02915 | 8/1984 | .............. C09J/3/00 |
| WO | WO 91/09915 | 7/1991 | ............ C09D/5/14 |
| WO | WO 91/14743 | 10/1991 | ............ C09D/5/14 |
| WO | WO 96/03465 | 2/1996 | ............ C09D/5/16 |

OTHER PUBLICATIONS

Japanese Abstract of Japanese Patent No. JP1103672, dated Apr. 20, 1989, *Sustained–Release Underwater Antifouling Agent.*

Japanese Abstract of Japanese Patent No. JP6072807, dated Mar. 15, 1994, *Sustained–Release Aquatic Antifouling Agent.*

Japanese Abstract of Japanese Patent No. JP59142263, date Aug. 15, 1984, *Antifouling Paint.*

*Primary Examiner*—Kriellion A. Sanders
(74) *Attorney, Agent, or Firm*—Joan M. McGillycuddy; Lainie E. Parker

(57) ABSTRACT

An antifouling coating composition comprises a binder which is a salt of an amine containing at least one aliphatic hydrocarbon group having 8 to 25 carbon atoms and an addition copolymer of an olefinically unsaturated sulphonic acid, acid sulphate ester, phosphonic acid or acid phosphate ester and at least one olefinically unsaturated comonomer. The coating composition includes an ingredient having biocidal properties for aquatic organisms. The amine is preferably an amine having two aliphatic hydrocarbon groups each having 8 to 25 carbon atoms and the copolymer contains at least 5 mole % of units of an organocyclic ester or amide (A) of an olefinically unsaturated carboxylic acid. The organocyclic ester or amide (A) is preferably an isobornyl ester.

18 Claims, No Drawings

ANTIFOULING COATINGS

This is a continuation of PCT/GB99/00263, filed Jan. 26, 1999, designating the United States of America, which claimed priority of Great Britain Patent Application No. 9801747.8, filed on Jan. 27, 1998.

FIELD OF THE INVENTION

This invention relates to antifouling coatings. An antifouling coating is used as a top coat on ships' hulls and other surfaces such as fishing nets, oil rig supports, swimming pools and power station cooling inlets to inhibit the settlement and growth of aquatic organisms such as barnacles and algae, generally by release of a biocide for the aquatic organisms.

BACKGROUND ART

The most successful antifouling paints in recent years have been "self-polishing copolymer" paints based on a polymeric binder to which biocidal triorganotin moieties are chemically bound and from which the biocidal moieties are gradually hydrolysed by seawater, as described for example in GB-A-1457590. The polymer from which the triorganotin moieties have been hydrolysed becomes soluble in seawater, so that as the outermost paint layer becomes depleted of biocide it is swept off the surface of the hull by the movement of the ship through seawater. There has been a call for antifouling coatings which exhibit the "self-polishing" effect without necessarily releasing strongly biocidal triorganotin moieties. Self-polishing copolymer paints which release non-biocidal moieties are described for example in EP-A-69559 and WO-A-84/02915.

US-A-5116407 and EP-A-529693 describe an antifouling coating having marine biocidal properties and comprising as binder an acid-functional film-forming polymer whose acid groups are blocked by hydrolysable blocking groups which are monoamine groups forming organic-solvent-soluble amine salts of the polymer. JP-A-1-103672 discloses a similar composition. WO-A-91/09915 describes an antifouling coating which comprises a marine biocide and a binder which is a hydrolysable seawater-erodible polymer containing sulphonic acid groups in quaternary ammonium salt form. WO-A-96/03465 describes an antifouling coating composition comprising a water-erodible binder polymer having at least 3 limbs radiating from a central core, with protected acid functionality present in the limbs of the polymer. The protected acid functionality can be carboxylic or sulphonic acid groups blocked by a monoamine or quaternary ammonium group JP-A-6-72807 describes a persistent underwater antifouling agent which contains a polymer of average molecular weight from 3000 to 40000 obtained by the polymerization of (a) the reaction product of a polymerizable unsaturated monomer which has a sulphonic acid group and at least one type of higher aliphatic amine represented by the general formula (I)

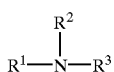

(I)

where $R^1$ represents a saturated or unsaturated aliphatic hydrocarbon group with 12 to 20 carbons, $R^2$ represents a hydrogen atom or an alkyl group with 1 to 6 carbons, and $R^3$ represents a hydrogen atom, an alkyl group with 1 to 6 carbons, a saturated or unsaturated aliphatic hydrocarbon group with 12 to 20 carbons, or an alkyl group with 1 to 6 carbons substituted with an amino group which may be substituted with an alkyl group with 1 to 6 carbons, or, alternatively, by the polymerization of the aforesaid reaction product (a) and some other polymerizable unsaturated monomer (b) which is copolymerizable therewith.

EP-A-232006 describes a water-erodible coating comprising an erodible polymer containing a hydrolysable sulphonate ester or sulphate ester group EP-A-429215 describes a process for preparing such a polymer.

SUMMARY OF THE INVENTION

An antifouling coating composition comprises a binder which is a salt of an amine containing at least one aliphatic hydrocarbon group having 8 to 25 carbon atoms and an addition copolymer of an olefinically unsaturated sulphonic acid, acid sulphate ester, phosphonic acid or acid phosphate ester and at least one olefinically unsaturated comonomer. The coating composition includes an ingredient having biocidal properties for aquatic organisms. The amine is preferably an amine having two aliphatic hydrocarbon groups each having 8 to 25 carbon atoms and the copolymer contains at least 5 mole % of units of an organocyclic ester or amide (A) of an olefinically unsaturated carboxylic acid. The organocyclic ester or amide (A) is preferably an isobornyl ester.

DISCLOSURE OF INVENTION

We have found that antifouling coating compositions based on a binder which is a salt of an amine having at least one aliphatic hydrocarbon group having 8 to 25 carbon atoms and an addition copolymer of an olefinically unsaturated sulphonic acid, acid sulphate ester, phosphonic acid or acid phosphate ester can exhibit a "self-polishing" effect. However, the presence of the highly hydrophilic sulphonate, sulphate, phosphonate or phosphate groups to render the copolymer "self-polishing" may lead to a weak water-swellable coating. We have found that this can be overcome by the use of hydrophobic comonomers, but that most hydrophobic comonomers such as lauryl methacrylate or butyl acrylate produce an undesirably soft copolymer of very low Tg when used in conjunction with long-chain amine salts, and that coatings based on such a soft copolymer may have lower mechanical strength when wet than is desired for use as an antifouling coating.

As disclosed in U.S. Pat. No. 5116407 and in JP-A-1-103672, amines containing one aliphatic or cycloaliphatic hydrocarbon group having 12 to 20 carbon atoms are generally toxic to aquatic organisms. There is a demand in some countries for a "self-polishing" antifouling paint in which the binder polymer is substantially non-toxic even though it is used with known biocides for aquatic organisms such as cuprous oxide. We have found that, contrary to the teaching of JP-A-6-72807, salts of a sulphonic acid copolymer with an amine having one methyl or ethyl group and two aliphatic hydrocarbon groups each having 8 to 25 carbon atoms are generally substantially non-toxic and can be used as the binder for a "self-polishing" antifouling coating. They are, however, equally as water-sensitive as other amine salts of sulphonic acid copolymers and are even softer than other amine salts. They can therefore be used in compositions including an ingredient having biocidal properties for aquatic organisms as the outermost coating on a substrate which is to be underwater in use so as to inhibit the settlement and growth of aquatic organisms.

According to one aspect of the present invention, an antifouling coating composition comprising a binder which is a salt of an amine containing at least one aliphatic hydrocarbon group having 8 to 25 carbon atoms and an addition copolymer of an olefinically unsaturated sulphonic acid, acid sulphate ester, phosphonic acid or acid phosphate ester and at least one olefinically unsaturated comonomer, the coating composition including an ingredient having biocidal properties for aquatic organisms, is characterised in that the amine is an amine having two aliphatic hydrocarbon groups each having 8 to 25 carbon atoms and the copolymer contains at least 5 mole % of units of an organocyclic ester or amide (A) of an olefinically unsaturated carboxylic acid. By an organocyclic ester or amide we mean an ester of an alcohol, or an amide of an amine, containing at least one saturated, unsaturated or aromatic ring which may be carbocyclic or heterocyclic and substituted or unsubstituted and in which the alcohol or amine group can be bonded to the ring directly or through an alkylene or oxyalkylene linkage.

The invention is described below with particular reference to sulphonic acid copolymers; in general acid sulphate ester, phosphonic acid and acid phosphate ester copolymers can be used as alternatives to sulphonic acid copolymers.

We have found that the organocyclic ester or amide comonomer tends to make the copolymer both more hydrophobic and harder, compared to polymers prepared using only conventional hydrophobic acrylate ester comonomers such as butyl acrylate, 2-ethylhexyl acrylate or lauryl methacrylate. Copolymers containing organocyclic ester or amide monomer units and units of a sulphonic acid salt of an amine having at least one long-chain hydrocarbon group have improved resistance to cold flow and improved mechanical properties in service in seawater and are more resistant to damage whilst retaining their "self-polishing" properties.

The organocyclic ester or amide (A) can for example be a cycloaliphatic, aryl, aralkyl or heterocyclic ester or amide. It is preferably a cycloaliphatic ester and is most preferably a bicyclic ester such as isobornyl methacrylate or acrylate, bornyl acrylate or methacrylate or norbornyl methacrylate or acrylate or bicyclo(2,2,1)-5-heptene-2-methyl methacrylate or acrylate, dicyclopentenyl or dicyclopentenyloxyethyl or dihydrocyclopentadienyl methacrylate or acrylate or a more highly cyclic, for example tricyclic, ester such as adamantyl acrylate or methacrylate. We have found that paints based on copolymers of such cycloaliphatic esters, most particularly isobornyl esters, give the best mechanical properties in service in seawater. Alternatives are monocyclic esters such as cyclohexyl or cyclopentyl methacrylate or acrylate, methyl methacrylate, 3,3,5-trimethylcyclohexyl methacrylate, t-butylcyclohexyl acrylate or methacrylate or cyclohexylmethyl acrylate or methacrylate. The ester or amide (A) is preferably an ester of an alpha, beta-olefinically unsaturated carboxylic acid such as acrylic, methacrylic or itaconic acid. The amide is preferably a cycloaliphatic amide, most preferably a bicyclic (e.g. bornyl, isobornyl or norbornyl) amide or a more highly cyclic, for example tricyclic, amide as described above for the esters. An example of a preferred cycloaliphatic amide is N-isobornyl acrylamide.

Thus, according to another aspect of the invention an antifouling coating composition comprising a binder which is a salt of an amine containing at least one aliphatic hydro-carbon group having 8 to 25 carbon atoms and an addition copolymer of an oletinically unsaturated sulphonic acid, acid sulphate ester, phosphonic acid or acid phosphate ester and at least one olefinically unsaturated comonomer, the coating composition including an ingredient having biocidal properties for aquatic organisms, is characterised in that the copolymer contains at least 5 mole % of units of an isobornyl ester or amide of an olefinically unsaturated carboxylic acid.

Examples of aryl esters (A) are phenyl or naphthyl acrylate or methacrylate. Examples of aralkyl esters (A) are benzyl, naphthyloxyethyl, phenoxyethyl or phenylpropyl acrylate or methacrylate. Examples of heterocyclic esters (A) are furfuryl or tetrahydrofurfuryl methacrylate or acrylate.

The ester or amide monomer (A), particularly a cycloaliphatic ester monomer such as isobornyl acrylate and/or isobornyl methacrylate, is present as at least 5 and preferably at least 10, most preferably at least 20, mole % of the copolymer, e.g. sulphonic acid copolymer, and may be present at up to 70 or 80 mole % or even more. More than one cycloaliphatic, aryl, aralkyl and/or heterocyclic ester monomer may be present if desired. The copolymer can for example be a binary copolymer of e.g. sulphonic acid amine salt and organocyclic ester monomer (A) or can additionally contain units of at least one ethylenically unsaturated comonomer. Examples of ethylenically unsaturated comonomers which can be copolymerised by addition polymerisation with e.g. sulphonic acid or salt monomers and ester monomers (A) to form copolymers for use in the invention are acrylic or methacrylic esters such as methyl acrylate, methyl methacrylate, ethyl acrylate, butyl acrylate, isobutyl methacrylate, t-butyl acrylate, butyl methacrylate, isobutyl acrylate, 2-ethylhexyl methacrylate, lauryl methacrylate or stearyl methacrylate, styrene, vinyl toluene, acrylonitrile, acrylamide or N-alkyl acrylamides such as N-t-octyl acrylamide, vinyl acetate, vinyl butyrate, vinyl esters of higher carboxylic acids such as versatic acid (a mixture of branched 10–12C carboxylic acids) and vinyl chloride.

To achieve the desired hardness, toughness and Tg in combination with reduced water-sensitivity, a copolymer comprising a sulphonic acid amine salt as defined, at least 5, most preferably at least 10, mole % of an organocyclic ester (A) as defined and at least 5, most preferably at s least 10, mole % of an acyclic alkyl ester (B) of an olefinically unsaturated carboxylic acid having 4 to 20, most preferably 4 to 8, carbon atoms in the alkyl group may be preferred. The acyclic alkyl ester can for example be butyl acrylate or isobutyl methacrylate. The total amount of units (A) and (B) in the copolymer is preferably at least 40 mole %, more preferably at least 60 mole %, up to 70 or 80 mole % or even more. Most preferably the copolymer is a terpolymer consisting essentially of sulphonic acid amine salt units and units of monomers (A) and (B).

Thus, according to a third aspect of the invention there is provided an antifouling coating composition comprising a binder which is a salt of an amine containing at least one aliphatic hydrocarbon group having 8 to 25 carbon atoms and an addition copolymer of an olefinically unsaturated sulphonic acid, acid sulphate ester, phosphonic acid or acid phosphate ester and at least one olefinically unsaturated comonomer, the coating composition including an ingredient having biocidal properties for aquatic organisms, characterised in that the copolymer contains at least 5 mole % of an organocyclic ester (A) of an olefinically unsaturated carboxylic acid preferably of one of the types mentioned above and at least 5 mole % of an acyclic alkyl ester (B) of an olefinically unsaturated carboxylic acid having 4 to 20 carbon atoms in the alkyl group, the total amount of units (A) and (B) in the copolymer being at least 40 mole %.

An alternative preferred copolymer contains at least 5 mole % of units of an organocyclic acrylate ester and at least 5 mole % of units of an organocyclic methacrylate ester. The organocyclic acrylate and methacrylate esters are preferably cycloaliphatic esters, for example isobornyl acrylate and methacrylate. More preferably, the copolymer contains at least 15 or 25 mole % each, up to a total of 70 or 80 mole %, of the units of organocyclic acrylate and methacrylate esters, for example a terpolymer of sulphonic acid amine salt units and isobornyl acrylate and methacrylate units.

Thus, according to a fourth aspect of the invention there is provided an antifouling coating composition comprising a binder which is a salt of an amine containing at least one aliphatic hydrocarbon group having 8 to 25 carbon atoms and an addition copolymer of an olefinically unsaturated sulphonic acid, acid sulphate ester, phosphonic acid or acid phosphate ester and at least one olefinically unsaturated comonomer, the coating composition including an ingredient having biocidal properties for aquatic organisms, characterised in that the copolymer contains at least 5 mole % of an organocyclic acrylate ester and at least 5 mole % of an organocyclic methacrylate ester. The organocyclic esters are preferably of the types mentioned above.

The olefinically unsaturated acid monomer for the addition copolymer with which the amine forms a salt is preferably a sulphonic acid. Examples of sulphonic acid monomers which can be used in preparing the copolymer are acrylic monomers such as 2-acrylamido-2-methylpropane sulphonic acid (AMPS), 2-sulphoethyl acrylate ($CH_2=CHCOOCH_2CH_2SO_3H$) or 2-sulphoethyl methacrylate, styrene sulphonic acid (for example p-styrene sulphonic acid), vinyl sulphonic acid or methallyl sulphonic acid. An example of an acid sulphate ester monomer is the sulphuric acid monoester of hydroxyethyl methacrylate (methacryloxyethyl monosulphate). Examples of phosphonic acid monomers are vinyl phosphonic acid, styrene phosphonic acid and 2-acrylamido-propanephosphonic acid. Phosphonic acids are generally dibasic and preferably have both acid groups in amine salt form or may have one acid group esterified. Examples of acid phosphate ester monomers are methacryloxyethyl monophosphate and acryloxyethyl monophosphate. The copolymer generally contains at least 5 mole %, preferably at least 10 mole %, of the monomer units having sulphonic acid etc. functionality, up to 50 mole %, preferably up to 40 mole %. Most preferably, the copolymer contains at least 15 mole % up to 30 to 35 mole % sulphonic acid etc monomer units.

The amine is preferably a tertiary amine, although secondary amines and in the case of some aspects primary amines can alternatively be used. We have found that a binder which is a tertiary amine salt of a sulphonic acid-functional polymer gives lower and more stable paint viscosity when a solution of the binder is mixed with a biocidal pigment which is a copper or zinc compound which is sparingly soluble in seawater, compared to primary or secondary amine salts. In many cases a substantially non-toxic amine, having two aliphatic hydrocarbon groups each having 8–25, for example 8–20, preferably 12–18, carbon atoms as described above, is preferred. Tertiary amines containing one methyl or ethyl group in addition to the $C_{8-20}$ aliphatic groups are particularly preferred, for example methyl bis(hydrogenated tallow) amine (M2HT), methyl dioctadecyl amine, methyl dioctyl amine or methyl dicoco amine. M2HT has the chemical formula $CH_3NR_2$ where R represents a mixture of alkyl radicals, mainly octadecyl and hexadecyl, derived from hydrogenated tallow. Similarly, methyl dicocoamine contains a mixture of alkyl radicals, mainly dodecyl and tetradecyl, derived from coconut oil.

Examples of alternative amines for use in some aspects of the invention are dimethyl dodecyl amine, dimethyl hexadecyl amine, dimethyl oleyl amine, dimethyl abietyl amine, dimethyl hydrogenated tallow amine, or dimethyl coco amine. Tertiary amines containing one long-chain aliphatic radical having 8 or more, preferably 8–25, carbon atoms together with two lower alkyl groups e.g. of up to 4 carbon atoms such as methyl, for example dimethyl dodecyl amine, dimethyl oleyl amine, dimethyl abietyl amine or dimethyl coco amine, generally have biocidal properties against certain aquatic organisms such as algae and barnacles and may be preferred for use as the only ingredient having aquatic biocidal properties or to augment other biocides present in the antifouling coating. Examples of primary amines are dodecylamine, hexadecylamine, octadecylamine, oleylamine, dehydroabietylamine (Rosin Amine D) and hydrogenated tallow amine. Examples of secondary amines are N-methyl dodecylamine and N-methyl coco amine.

The copolymers of the invention can be prepared by various methods, which will be discussed below in relation to sulphonic acids although similar methods may be applicable to the acid sulphate esters, phosphonic acids and acid phosphate esters. In one process a polymerisable olefinically unsaturated sulphonic acid is reacted with an amine and the resulting amine salt of the unsaturated sulphonic acid is copolymerised with the monomer (A) and optionally with one or more olefinically unsaturated comonomers to form a copolymer which is an amine salt of a sulphonic acid-functional polymer. Alternatively, a sulphonic acid-functional copolymer containing units (A) is reacted with an amine to form an amine salt of the sulphonic acid-functional polymer.

When the polymerisable olefinically unsaturated sulphonic acid is reacted with an amine to form a salt before polymerisation, this reaction is preferably carried out in an organic solvent, for example an alcohol such as n-butanol, an ether alcohol such as butoxyethanol or methoxypropanol, an ester such as butyl acetate or isoamyl acetate, an ether-ester such as ethoxyethyl acetate or methoxypropyl acetate, a ketone such as methyl isobutyl ketone or methyl isoamyl ketone, or an aromatic hydrocarbon such as xylene, toluene or trimethylbenzene, or a mixture of two or more of these solvents. The solvent can be water-miscible or water-immiscible. Some sulphonic acid monomers, such as AMPS, are insoluble in most common organic solvents, but their salts with amines having at least one $C_{8-25}$ hydrocarbon group are generally soluble in the solvents listed above. The amine and sulphonic acid can thus be mixed in the organic solvent to produce a solution of the amine salt of the sulphonic acid; for an insoluble sulphonic acid, visual disappearance of the sulphonic acid indicates completion of the salt-forming reaction. Many long-chain amines are solid, such as M2HT, which melts at about 35° C. A solid amine is preferably either melted before mixing with the sulphonic acid or heated to melt it as it is being mixed with the sulphonic acid. The salt-forming reaction is generally exothermic. The amine sulphonic acid salt can be isolated if desired, for example by evaporation of solvent or in some cases by slow crystallisation of the salt at ambient temperature or below, but it is preferably used in solution.

The amine salt of the olefinically unsaturated sulphonic acid can be polymerised by addition polymerisation with the required comonomer(s). Polymerisation is preferably carried out in an organic solvent, for example a solvent as listed above or a blend of two or more of those solvents, using a free radical initiator such as an azo compound, for example azobisisobutyronitrile or azobis (methylbutyro-nitrile), or a peroxide such as benzoyl peroxide. Most preferably, the polymerisation is carried out in a solvent comprising at least partly the solvent in which the amine salt is prepared, so that the solution of amine salt as prepared can be added directly to the polymerisation reaction. The temperature of polymerisation is generally in the range 50–150° C., preferably 60–120° C. Polymerisation can be carried out with all the monomers present at the start of the reaction, or one or more of the monomers can be added as polymerisation progresses. A chain-transfer agent, for example a mercaptan such as dodecane-1-thiol, can be used if required to control the molecular weight of the copolymer formed.

The weight-average molecular weight of the copolymer (Mw) as determined by gel permeation chromatography is generally at least 1,000, preferably at least 2,000, to give the required film strength in the coating after application, while being generally below 150,000, preferably below 100,000 and most preferably no more than 60,000, to achieve a paint viscosity low enough for spraying at a high-solids level.

Alternatively, the olefinically unsaturated sulphonic acid can be polymerised, using similar polymerisation conditions to those set forth above, and preferably using a solvent in which the sulphonic acid and the comonomer(s) are soluble, and the sulphonic acid polymer formed can be reacted with the amine. For some sulphonic acid monomers, particularly AMPS, it may be difficult to find a suitable polymerisation solvent and in such a case polymerisation of the amine salt is preferred.

If a water-based paint is required, the amine salt of the sulphonate-functional polymer can be prepared in organic solvent solution and dispersed in water, usually with the aid of a surfactant. The organic solvent can be partly or substantially completely removed from the resulting dispersion. For example, the sulphonate salt binder polymer can be prepared in a solvent which is more volatile than water or forms an azeotrope with water and the solvent can be removed by distillation.

In an alternative way of preparing a water-based dispersion of an amine salt of a sulphonate-functional binder polymer, the polymer can be prepared by emulsion or suspension polymerisation. An amine salt of an ethylenically unsaturated sulphonic acid can for example be copolymerised with at least one ethylenically unsaturated comonomer as an oil-in-water emulsion using an anionic, cationic, nonionic or amphoteric surfactant in the presence of a free radical initiator.

The solution, dispersion or emulsion of the binder polymer can be used as a clear antifouling varnish if the amine used has adequate biocidal properties for aquatic organisms, but it is more usually blended with a biocide (an ingredient having biocidal properties) for aquatic organisms and usually with a pigment using conventional paint-blending techniques. The biocide may itself be all or part of the pigment of the paint. If it is pigmented, the coating composition preferably has a pigment volume concentration of, for example, 15 to 55%. The pigment preferably comprises at least one sparingly soluble metalliferous pigment having a solubility in seawater of from 0.5 to 100, preferably 1 to 10, parts per million by weight. Examples of such pigments which are also aquatic biocides include copper or zinc compounds, such as cuprous oxide, cuprous thiocyanate, cuprous sulphate, zinc ethylene bis(dithiocarbamate), zinc dimethyl dithiocarbamate, zinc pyrithione, copper pyrithione, zinc diethyl dithiocarbamate, copper resinate or cuprous ethylene bis-(dithiocarbamate) and certain other sparingly seawater-soluble metalliferous pigments, for example manganese ethylene bis(dithiocarbamate). Other sparingly soluble pigments having a solubility in seawater of 0.5 to 100, preferably 0.5 or 1 to 10, parts per million include barium sulphate, calcium sulphate, dolomite and zinc oxide. Copper metal can be present as an aquatic biocide, for example in flake or powder form.

The sparingly soluble metalliferous pigments produce water-soluble metal compounds on reaction with seawater, so that the pigment particles do not survive at the paint surface. This promotes the "self-polishing" action of the paint in which the amine group is gradually released from the surface of the paint film through interaction with seawater species to give a polymer containing free sulphonic groups, which gradually dissolves in seawater. Mixtures of sparingly soluble pigments can be used, for example cuprous oxide, cuprous thiocyanate or zinc ethylene bis-(dithiocarbamate), which are highly effective biocidal pigments, can be mixed with zinc oxide, which is not effective as a biocide but dissolves slightly more rapidly in seawater.

The antifouling coating composition can contain a non-metalliferous biocide for marine organisms, for example tetramethyl thiuram disulphide, methylene bis(thiocyanate), captan, pyridinium triphenylboron, a substituted iso-thiazolone such as 4,5-dichloro-2-N-octyl-4-isothiazolin-3-one, 2-methylthio-4-t.butylamino-6-cyclopropylamino-s-triazine, N-3,4-dichlorophenyl-N',N'-dimethyl-urea ("Diuron"), 2-(thiocyanomethylthio) benzothiazole, 2,4,5,6-tetrachloro-isophthalonitrile, dichlorofluanid, tolylfluanid or 2,3,5,6-tetrachloro-4-(methylsulphonyl) pyridine. Such a non-metalliferous biocide can be used in addition to a sparingly soluble copper or zinc compound, or one or more non-metalliferous biocides can be used as the only biocide of the coating in a copper-free, or even metal-free or pigment—free, antifouling coating. Many of these non-metalliferous biocides are solid and all are sparingly soluble in seawater and may help the "self-polishing" action of the paint. The ingredient having biocidal properties can be present at 0.01 to 90% by weight of the composition, depending on its biocidal effectiveness.

The coating composition can additionally contain a pigment which is not reactive with seawater and may be highly insoluble in seawater (solubility below 0.5 part per million by weight) such as titanium dioxide or ferric oxide or an organic pigment such as phthalocyanine or azo pigment. Such highly insoluble pigments are preferably used at less than 60% by weight of the total pigment component of the paint, most preferably less than 40%.

The coating composition can additionally contain one or more plasticisers, for example a chlorinated paraffin, a phthalate diester or a phosphate triester, and/or one or more auxiliary film-forming agents, for example a vinyl polymer, such as a copolymer of vinyl chloride with a vinyl ether, a vinyl ester such as vinyl acetate, vinyl alcohol and/or an acrylic monomer or a hydrocarbon resin. Plasticisers and/or auxiliary film-forming agents, if present, are generally used at up to 30% by volume based on the dry paint film, preferably 5–20% by volume. The coating composition can additionally contain conventional thickeners, particularly thixotropes such as silica or bentonite and/or stabilisers such as zeolites.

The invention is illustrated by the following Examples:

EXAMPLE 1 a. Binder Polymer Preparation

Acrylamido 2-methylpropanesulphonic acid (AMPS, 62.9 g) is was neutralised with methyl bis(hydrogenated tallow) amine (M2HT, 159.1 g) in xylene (90 g) and butanol (30 g) to give a solution of the M2HT salt of AMPS. Isobornyl acrylate 173.9 g), butyl acrylate (48.6 g) and azobismethylbutyronitrile (2.9 g) were added and the combined solution was polymerised by slow addition to a stirred reaction vessel containing xylene (123.8 g) and butanol (41.2 g) at 90° C. 30 minutes after completion of the monomer addition, a suspension of azobisisobutyronitrile (AZDN, 1.2 g) in xylene (5.6 g) and butanol (1.9 g) was added to the reaction vessel, and, after a further 45 minutes, a second suspension of AZDN (1.2 g) in xylene (5.6 g) and butanol (1.9 g) was added to the reaction vessel, the vessel being maintained at 90° C. throughout and thereafter for a further 60 minutes.

The product was a 60% by weight solution in xylene and butanol (3:1 by weight) of a copolymer of the M2HT salt of AMPS (20 mole %), isobornyl acrylate (55 mole %) and butyl acrylate (25 mole %). The copolymer had a weight-average molecular weight of about 6,500.

b. Paint Preparation 27.8% (all percentages by weight) of the above copolymer solution was mixed with 15.9% solvent (xylene, butanol and methyl isoamyl ketone), 0.1% hydroquinone stabiliser, 2.0% thickeners (bentonite clay and silica aerogel), 6.4% plasticisers ("Lutonal" vinyl chloride copolymer and chlorinated paraffin) and 47.8% pigments (cuprous oxide, zinc ethylene bis(dithiocarbamate), zinc oxide, titanium dioxide and C.I. pigment red) in a high-speed disperser to form a self-polishing antifouling paint.

As a test of antifouling performance, the paint was applied to a ply-wood board which had been pre-painted with a commercial anti-corrosive primer (JVA202/203, International Paints) and the board was immersed in the sea at Newton Ferrers, Devon, England, a site particularly subject to algal fouling. Some paints were also tested similarly in the sea at Burnham-on-Crouch, Essex, England, a site particularly subject to barnacle fouling. The paint film was periodically assessed for settlement of marine fouling organisms and results are shown in Table 2 below.

As a test of self-polishing performance, the paint was also tested on a rotating disc apparatus of the type described in GB-A-1457590 and the film thickness measured before and after rotation in sea water. The mechanical properties of the paint film were also assessed during this period. Results are shown in Table 2 below.

Examples 2–17 and Comparative
Examples C1 and C4

Following the procedures of Example 1a, copolymers of the compositions in mole% shown in Table 1 below were prepared in solution at the % by weight and in the solvent indicated.

Self-polishing antifouling paints were prepared following the procedure and composition of Example 1b but using the copolymer solutions prepared in Examples 2–17 or C1 or C4 in place of the copolymer solution of Example 1. The paints were assessed for antifouling and self-polishing performance and for mechanical properties as described in Example 1. The results are shown in Table 2 below.

Comparative Example C2

A commercial organotin-based SPC paint (BFA976, International Paint) was tested for antitouling, self-polishing and mechanical performance as described above. Results are shown in Table 2 below.

Comparative Example C3

A commercial anti-corrosive primer (JVA202/203, is International Paints) was tested for antifouling, self-polishing and mechanical performance as described above. Results are shown in Table 2 below.

TABLE 1

Binder Polymer Preparation

| Example | AMPS- | iBoA | iBoMA | iBMA | BA | iBA | CHMA | TMCH | BzMA | % by wt | X:B |
|---|---|---|---|---|---|---|---|---|---|---|---|
| 1a | 25 | 55 | | | 20 | | | | | 60 | 3:1 |
| 2a | 20 | 55 | | | 25 | | | | | 60 | 3:1 |
| 3a | 29.8 | | 34 | 36.2 | | | | | | 60 | 3:1 |
| 4a | 24.6 | | 41.7 | 33.7 | | | | | | 60 | 3:1 |
| 5a | 23.4 | | 76.6 | | | | | | | 55 | 1:0 |
| 6a | 32 | | 68 | | | | | | | 55 | 1:0 |
| 7a | 38.3 | | 61.7 | | | | | | | 55 | 1:0 |
| 8a | 22 | | | | | | 78 | | | 55 | 1:0 |
| 9a | 26 | | | | | | | 74 | | 55 | 1:0 |
| 10a | 20.5 | | | 43.1 | | 36.4 | | | | 55 | 1:0 |
| 11a | 22.2 | | | 46.4 | | | | 31.4 | | 55 | 1:0 |
| 12a | 20 | 55 | | | | 25 | | | | 60 | 3:1 |
| 13a | 27.5 | 25 | 47.5 | | | | | | | 60 | 3:1 |
| 14a | 30.5 | 23.5 | 46 | | | | | | | 60 | 3:1 |
| 15a | 25 | 34.7 | 40.3 | | | | | | | 60 | 3:1 |
| 16a | 35.2 | | 64.8 | | | | | | | 55 | 1:0 |
| 17a | 20 | | | | | | | | 80 | 60 | 3:1 |
| C1a | 20 | | | 80 | | | | | | 55 | 1:0 |
| C4a | 20 | | | | 80 | | | | | 60 | 3:1 |

Table 1 - key
AMPS-M2HT   methyl bis(hydrogenated tallow) amine salt of acrylamido 2-methylpropanesulphonic acid
iBoA        isobornyl acrylate
iBoMA       isobornyl methacrylate
iBMA        isobutyl methacrylate
BA          butyl acrylate
iBA         isobutyl acrylate
CHMA        cyclohexyl methacrylate
TMCHMA      trimethylcyclohexyl methacrylate
BzMA        benzyl methacrylate
X:B         xylene:butanol

TABLE 2

Paint Performance

| | A/F Performance | | | | | |
|---|---|---|---|---|---|---|
| | Newton Ferrers | | Burnham | | | |
| Example | Rating | Months | Rating | Months | SPC | MC |
| 1b | 84 | 6 | N/T | N/T | 1 | 1 |
| 2b | 84 | 6 | N/T | N/T | 1 | 1 |
| 3b | 72 | 6 | N/T | N/T | 1 | 1 |
| 4b | 72 | 6 | N/T | N/T | 1 | 1 |
| 5b | 76 | 7 | N/T | N/T | 1 | 1 |
| 6b | 64 | 6 | N/T | N/T | 1 | 1 |
| 7b | N/T | N/T | N/T | N/T | 1 | 1 |
| 8b | 80 | 7 | 64 | 6 | 1 | 1 |
| 9b | 72 | 6 | N/T | N/T | 1 | 1 |
| 10b | 80 | 7 | 64 | 6 | 1 | 1 |
| 11b | 72 | 6 | N/T | N/T | 1 | 1 |
| 12b | 56 | 6 | N/T | N/T | 1 | 1 |
| 13b | 44 | 7 | 72 | 5 | 1 | 1 |
| 14b | 44 | 7 | 88 | 5 | 1 | 1 |
| 15b | 0 | 7 | 56 | 5 | 1 | 1 |
| 16b | 64 | 6 | N/T | N/T | 1 | 1 |
| 17b | N/T | N/T | N/T | N/T | N/T | 1 |
| C1 | 72 | 7 | 88 | 6 | 1 | 0.5 |
| C2 | 88 | 7 | 64 | 6 | 1 | 1 |
| C3 | 0 | 6 | N/T | N/T | 0 | 1 |
| C4 | N/T | N/T | N/T | N/T | N/T | 0.1 |

Key
A/F Performance  0 = completely fouled after x months' immersion
100 = no fouling after x months' immersion
N/T = not tested
SPC (Self-polishing Performance)  0 = no reduction in film thickness on rotor testing
1 = consistent reduction in film thickness on rotor testing
MC (Mechanical Performance)  0 = severe tearing or detachment of the paint film
1 = no tearing or detachment of the paint film

What is claimed is:

1. An antifouling coating composition comprising a binder which is the salt of an amine containing two aliphatic hydrocarbon groups each having 8 to 25 carbon atoms and an addition copolymer of an olefinically unsaturated sulphonic acid, acid sulphate ester, phosphonic acid or acid phosphate ester and at least one olefincally unsaturated co-monomer, wherein said copolymer contains at least 5 mole % of units of an organocyclic ester or amide (A) of an olefinically unsaturated carboxylic acid, the coating composition including an ingredient having biocidal properties for aquatic organisms.

2. An antifouling coating composition according to claim 1, wherein the amine is a tertiary amine containing one methyl or ethyl group in addition to two aliphatic hydrocarbon groups each having 8 to 20 carbon atoms.

3. An antifouling coating composition according to claim 2, wherein the amine is methyl bis(hydrogenated tallow) amine.

4. An antifouling coating composition comprising a binder which is a salt of an amine containing at least one aliphatic hydrocarbon group having 8 to 25 carbon atoms and an addition copolymer of an olefinically unsaturated suliphonic acid, acid sulphate ester, phosphonic acid or acid phosphate ester and at least one olefinically unsaturated comonomer, the coating composition including an ingredient having biocidal properties for aquatic organisms, characterised in that the copolymer contains at least 5 mole % of units of an organocyclic ester (A) of an olefinically unsaturated carboxylic acid and at least 5 mole % of units of an acyclic alkyl ester (B) of an olefinically unsaturated carboxylic acid having 4 to 20 carbon atoms in the alkyl group, the total amount of units (A) and (B) in the copolymer being at least 40 mole %.

5. An antifouling coating composition according to claim 1, wherein the ester (A) is a cycloaliphatic ester.

6. An antifouling coating composition comprising a binder which is a salt of an amine containing at least one aliphatic hydrocarbon group having 8 to 25 carbon atoms and an addition copolymer of an olefinically unsaturated sulphonic acid, acid sulphate ester, phosphonic acid or acid phosphate ester and at least one olefinically unsaturated comonomer, the coating composition including an ingredient having biocidal properties for aquatic organisms, characterised in that the copolymer contains at least 5 mole % of units of an organocyclic acrylate ester and at least 5 mole % of units of an organocyclic methacrylate ester.

7. An antifouling coating composition according to claim 6, wherein the organocyclic acrylate and methacrylate esters are cycloaliphatic esters.

8. An antifouling coating composition according to claim 5, wherein the cycloaliphatic ester is isobornyl acrylate or methacrylate.

9. An antifouling coating composition according to claim 7, wherein the cycloaliphatic esters are isobornyl acrylate and isobornyl methacrylate.

10. An antifouling coating composition comprising a binder which is a salt of an amine containing at least one aliphatic hydrocarbon group having 8 to 25 carbon atoms and an addition copolymer of an olefinically unsaturated sulphonic acid, acid sulphate ester, phosphonic acid or acid phosphate ester and at least one olefinically unsaturated comonomer, the coating composition including an ingredient having biocidal properties for aquatic organisms, characterised in that the copolymer contains at least 5 mole % of units of an isobornyl ester or amide of an olefinically unsaturated carboxylic acid.

11. An antifouling composition according to claim 10, wherein the copolymer contains 20 to 80 mole % isobornyl acrylate and/or methacrylate units.

12. An antifouling coating composition according to claim 4, wherein the amine is a tertiary amine containing one aliphatic radical having 8 to 25 carbon atoms together with two lower alkyl groups.

13. An antifouling coating composition according to claim 1, wherein the copolymer contains 15 to 40 mole % olefinically unsaturated sulphonic acid units.

14. An antifouling composition according to claim 13, wherein the olefinically unsaturated sulphonic acid is 2-acrylamido-2-methylpropanesulphonic acid.

15. An antifouling coating composition according to claim 1, wherein the composition further comprises at least one plasticiser or auxiliary film-forming agent present at 5 to 30% by volume based on the composition when it is dry.

16. A process for the preparation of an antifouling coating composition according to claim 1, comprising reacting an amine and an olefinically unsaturated sulphonic acid, acid sulphate ester, phosphonic acid or acid phosphate ester to produce an amine salt in an organic solvent which is a solvent for the amine salt produced, polymerizing the resulting amine salt solution with at least one olefinically unsaturated comonomer including an organocyclic ester or amide present at at least 5 mole % of total monomers in the presence of a free radical initiator to produce a binder solution, and mixing the binder solution with an ingredient having biocidal properties for aquatic organisms.

17. Use of a composition according to claim 1, to inhibit the settlement and growth of aquatic organisms, comprising applying the composition as the outermost coating of a substrate which is underwater during use.

18. An antifouling coating composition according to claim 4, wherein the ester (A) is a cycloaliphatic ester.

* * * * *